US012682588B2

(12) United States Patent　　(10) Patent No.:　US 12,682,588 B2
Burgess　　(45) Date of Patent:　Jul. 14, 2026

(54) SYSTEM AND METHOD FOR ENHANCED PHYSICAL INTERACTION WITH VIRTUAL ENVIRONMENTS THROUGH PATTERN RECOGNITION AND FEEDBACK MECHANISMS

(71) Applicant: Brent Hubbard Burgess, Hampshire (GB)

(72) Inventor: Brent Hubbard Burgess, Hampshire (GB)

( * ) Notice: Subject to any disclaimer, the term of this patent is extended or adjusted under 35 U.S.C. 154(b) by 58 days.

(21) Appl. No.: 18/804,972

(22) Filed: Aug. 14, 2024

(65) Prior Publication Data

US 2025/0061678 A1　　Feb. 20, 2025

Related U.S. Application Data

(60) Provisional application No. 63/532,818, filed on Aug. 15, 2023.

(51) Int. Cl.
　G06T 19/20　　(2011.01)
　G06F 3/01　　(2006.01)
　G06T 19/00　　(2011.01)

(52) U.S. Cl.
　CPC ............. G06T 19/20 (2013.01); G06F 3/016 (2013.01); G06F 3/017 (2013.01); G06T 19/006 (2013.01); G06T 2219/2004 (2013.01)

(58) Field of Classification Search
　None
　See application file for complete search history.

(56) References Cited

U.S. PATENT DOCUMENTS

| | | | |
|---|---|---|---|
| 2005/0288078 A1 | 12/2005 | Cheok et al. | |
| 2013/0207373 A1* | 8/2013 | Lucas-Woodley | ...... A63F 13/69 |
| | | | 281/15.1 |
| 2013/0249944 A1* | 9/2013 | Raghoebardayal | ... G06T 19/006 |
| | | | 345/633 |
| 2013/0321463 A1* | 12/2013 | Clemo | .................. G06T 19/006 |
| | | | 345/633 |
| 2013/0321464 A1* | 12/2013 | Lucas-Woodley | ...... A63F 13/65 |
| | | | 345/633 |

(Continued)

OTHER PUBLICATIONS

International Search Report dated Oct. 21, 2024; Application No. PCT/EP2024/073020.

*Primary Examiner* — Ryan M Gray
(74) *Attorney, Agent, or Firm* — Patterson + Sheridan, LLP; Malgorzata A. Kulczycka

(57)　　　　ABSTRACT

A method and apparatus for enhancing user interaction within a virtual environment by linking physical objects to corresponding virtual manifestations. The method comprises: receiving, from a scanning device, an image of a pattern on a surface of a physical object; analyzing the image to recognize the pattern and associate the pattern with corresponding virtual content stored in data storage; rendering, by the computer system, a virtual manifestation within the virtual environment; receiving, from the scanning device, an indication of an occlusion of the pattern caused by user interaction with the physical object; interpreting the occlusion based on a user input to the virtual environment; modifying the virtual manifestation in response to the user input; updating the virtual manifestation in real-time to reflect movements of the physical object.

20 Claims, 9 Drawing Sheets

(56)     References Cited

U.S. PATENT DOCUMENTS

| | | | |
|---|---|---|---|
| 2014/0225919 A1* | 8/2014 | Kaino | H04N 7/183 |
| | | | 345/633 |
| 2016/0217620 A1* | 7/2016 | Constantinides | G06V 40/174 |
| 2016/0343164 A1* | 11/2016 | Urbach | G02B 27/017 |
| 2017/0337742 A1 | 11/2017 | Powderly et al. | |
| 2018/0045963 A1* | 2/2018 | Hoover | G02B 30/34 |
| 2018/0113505 A1* | 4/2018 | Choi | G06K 19/06037 |
| 2018/0205773 A1 | 7/2018 | Miller | |
| 2019/0266405 A1* | 8/2019 | Chang | G06F 3/011 |
| 2020/0357183 A1* | 11/2020 | Weber | G06F 3/013 |
| 2021/0011556 A1 | 1/2021 | Atlas et al. | |
| 2021/0375025 A1* | 12/2021 | Yan | G06V 10/757 |
| 2022/0253200 A1 | 8/2022 | Berliner et al. | |
| 2022/0269404 A1* | 8/2022 | Huang | G06F 3/0414 |
| 2022/0358689 A1 | 11/2022 | Bahulkar | |
| 2023/0013539 A1 | 1/2023 | Holland | |
| 2023/0082420 A1 | 3/2023 | Yu et al. | |
| 2023/0196689 A1 | 6/2023 | Jang et al. | |
| 2024/0104864 A1* | 3/2024 | Mulliken | G06F 3/013 |
| 2025/0148728 A1* | 5/2025 | Randles | G09B 5/02 |

* cited by examiner

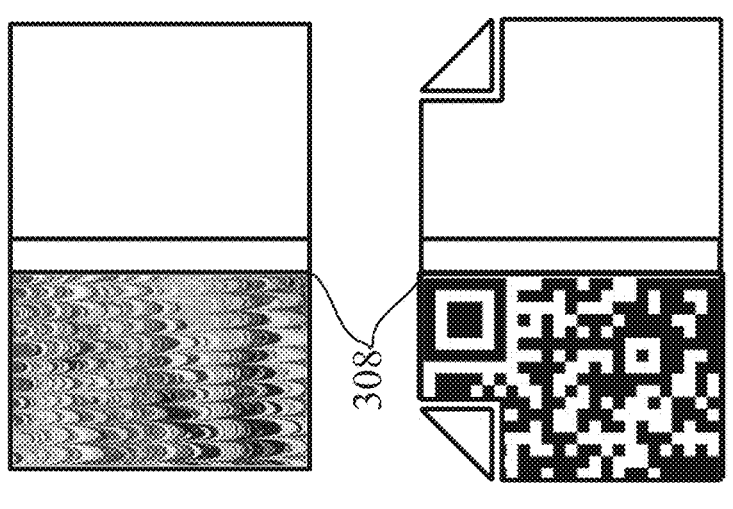
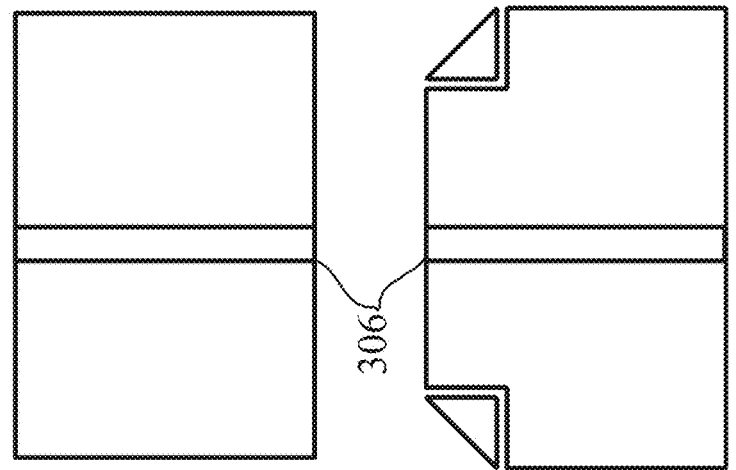
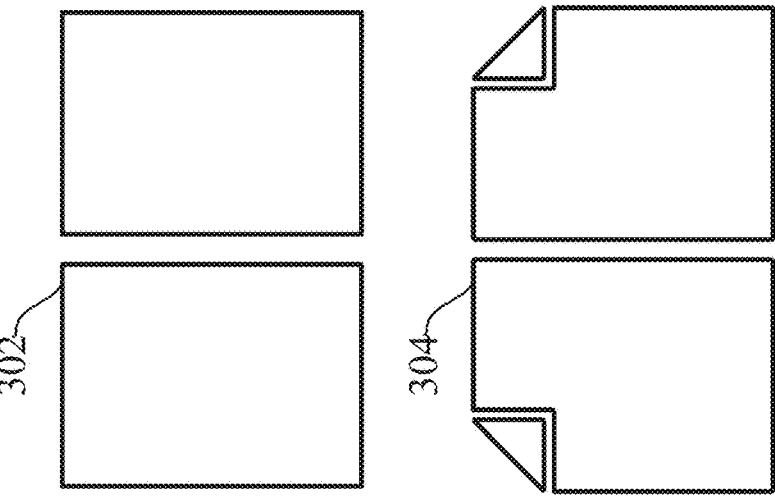
FIG. 3A

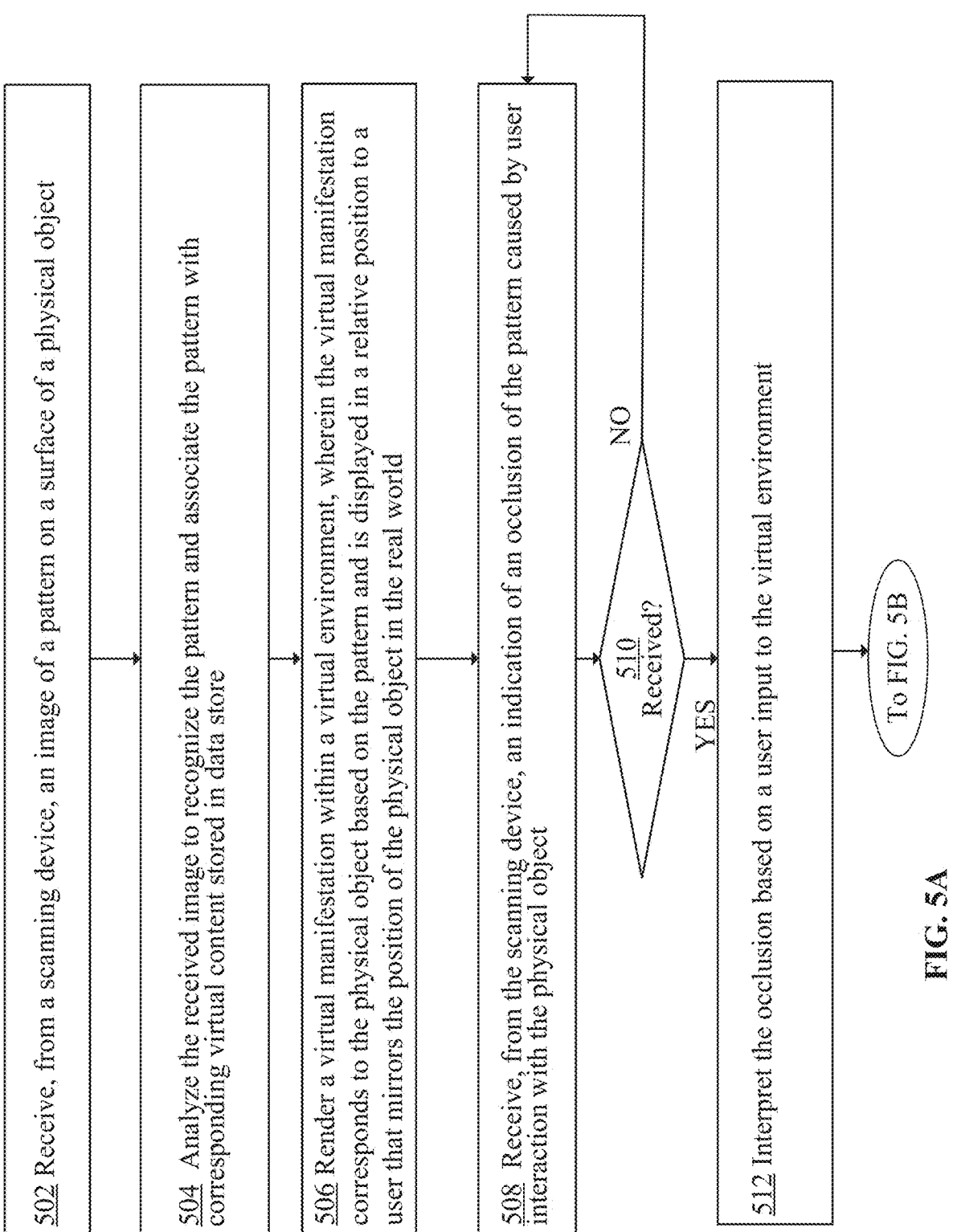

502 Receive, from a scanning device, an image of a pattern on a surface of a physical object 504 Analyze the received image to recognize the pattern and associate the pattern with corresponding virtual content stored in data store 506 Render a virtual manifestation within a virtual environment, wherein the virtual manifestation corresponds to the physical object based on the pattern and is displayed in a relative position to a user that mirrors the position of the physical object in the real world 508 Receive, from the scanning device, an indication of an occlusion of the pattern caused by user interaction with the physical object 510 Received?

NO

YES

512 Interpret the occlusion based on a user input to the virtual environment

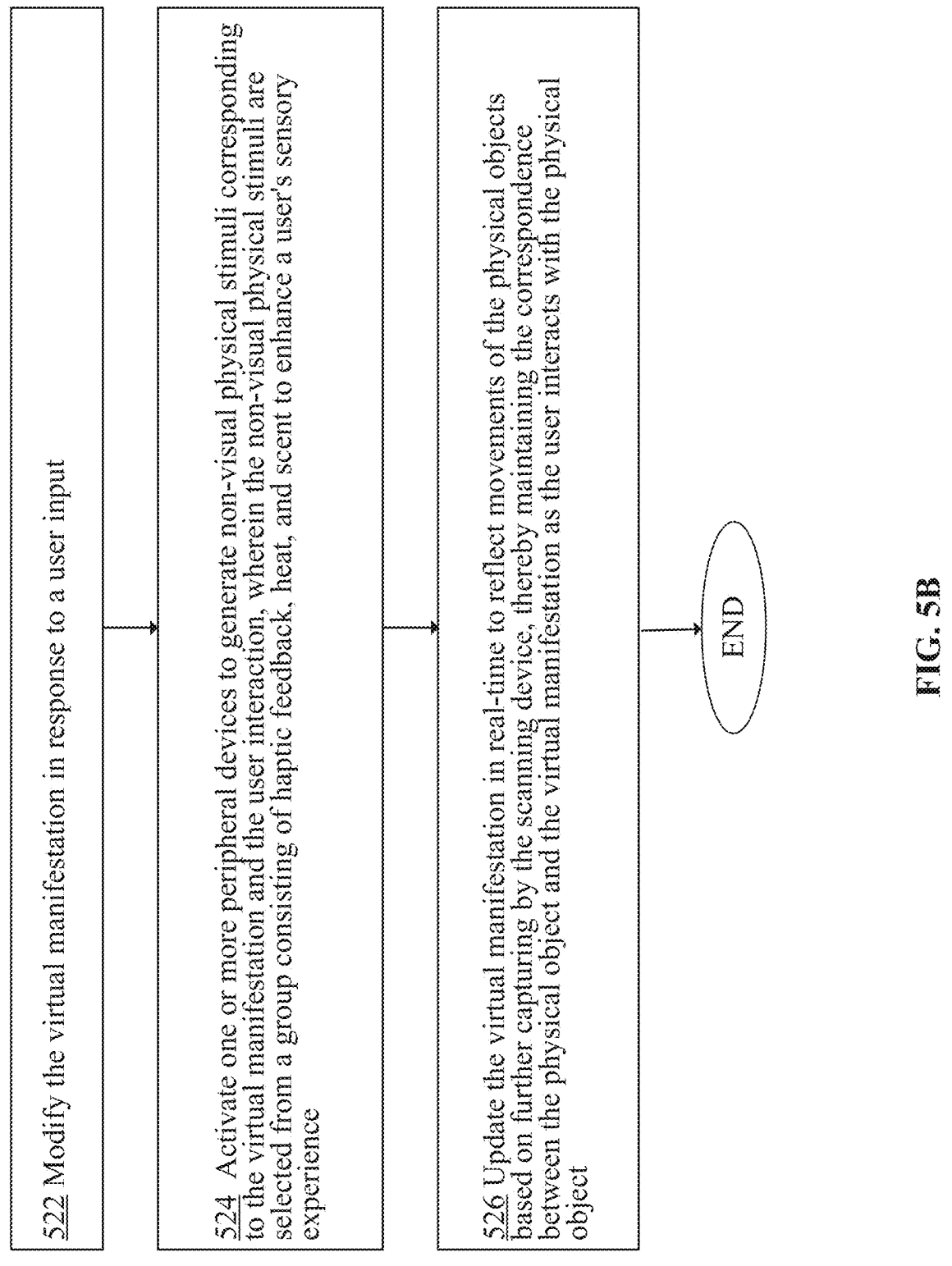

522 Modify the virtual manifestation in response to a user input

524 Activate one or more peripheral devices to generate non-visual physical stimuli corresponding to the virtual manifestation and the user interaction, wherein the non-visual physical stimuli are selected from a group consisting of haptic feedback, heat, and scent to enhance a user's sensory experience 526 Update the virtual manifestation in real-time to reflect movements of the physical objects based on further capturing by the scanning device, thereby maintaining the correspondence between the physical object and the virtual manifestation as the user interacts with the physical object

END

FIG. 5B

SYSTEM AND METHOD FOR ENHANCED PHYSICAL INTERACTION WITH VIRTUAL ENVIRONMENTS THROUGH PATTERN RECOGNITION AND FEEDBACK MECHANISMS

CROSS-REFERENCE TO RELATED APPLICATIONS

This application claims benefit of U.S. provisional patent application Ser. No. 63/532,818, filed Aug. 15, 2023, which is herein incorporated by reference.

FIELD OF DISCLOSURE

The present disclosure relates to computer-implemented methods for enhancing user interaction within artificial, virtual, and mixed-reality environments through pattern recognition and management and the application of virtual volumes to physical objects and surfaces.

BACKGROUND

The current interfaces within simulated environments often lack the integration of tangible elements, leading to a disconnect between the digital and the tangible world. This disconnect limits the depth of engagement and the overall experience within artificial environments. Users are generally limited to indirect interaction methods through traditional input devices, which may not fully replicate the experience of interacting with elements that have a physical presence. The absence of direct physical interaction can reduce the sense of presence and immersion, as users primarily rely on visual and auditory cues without reinforcing tactile experiences.

Attempts to enhance the interaction between the real and simulated worlds have included using object and surface recognition of tangible objects and the analysis of these objects to generate corresponding digital representations or planes within simulated environments. Additional equipment has been employed to provide sensory feedback beyond the visual domain to strengthen the connection with the tangible world during digital interactions.

Despite these efforts, there is an ongoing need for more integrated and interactive methods and systems to offer a richer and more tactile experience within simulated spaces, potentially improving the user's sense of presence and engagement.

Furthermore, current systems for integrating the tangible world with virtual environments lack a physical method to affix virtual objects, displays, and user interfaces to specific physical objects or surfaces. This creates a lack of persistence of a physical location that can be used to create experiences or components in a predictable physical location by a physical object and accessed by any number of individuals, irrespective of a system's knowledge of a specific environment.

SUMMARY

The claims may serve as a summary of the disclosure.

BRIEF DESCRIPTION OF THE DRAWINGS

FIG. 3A illustrates pattern applications on a physical object resembling a book cover.

FIG. 5A is a flow chart depicting an example process.

FIG. 5B is a flow chart depicting an example process.

Figure 1A:
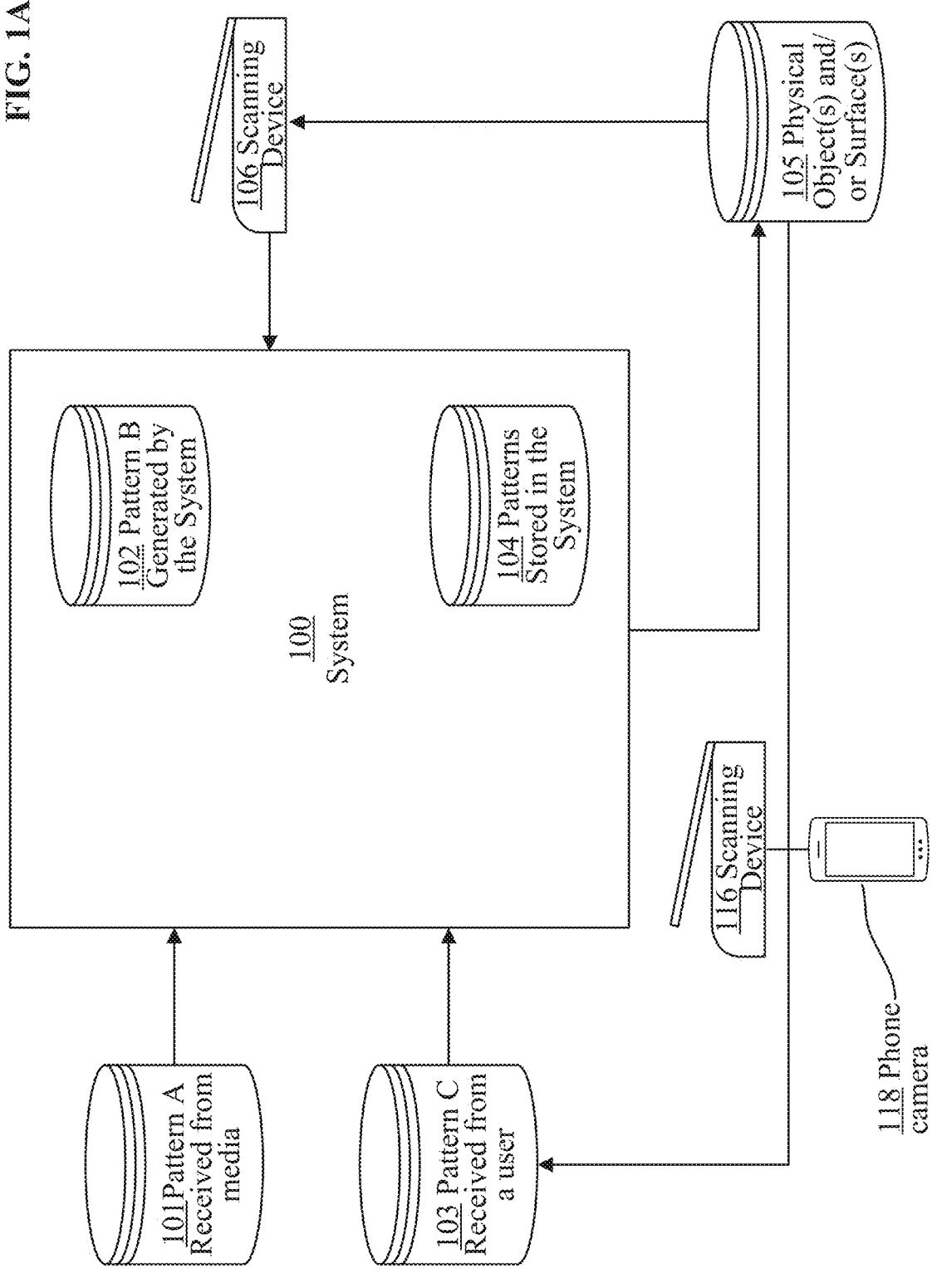
FIG. 1A depicts a block diagram of the system with various pattern inputs.

All the drawings, descriptions, and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

DESCRIPTION OF EXAMPLE EMBODIMENTS

In the following description, numerous specific details are set forth in order to provide a thorough understanding of the present approach. It will be apparent, however, that the present approach may be practiced without these specific details. In other instances, well-known structures and devices are shown in block diagram form to avoid unnecessarily obscuring the present approach.

Embodiments are described herein according to the following outline:

1.0. GENERAL OVERVIEW
   1.1. TECHNICAL PROBLEM-TECHNICAL SOLUTION
   1.2. TECHNICAL EFFECTS
   1.3. TERM DEFINITIONS
2.0. EXAMPLE BLOCK DIAGRAM OF A SYSTEM WITH VARIOUS PATTERN INPUTS
3.0. EXAMPLES OF VARIOUS PATTERN TYPES USED FOR RECOGNITION
4.0. DIFFERENT EMBODIMENTS
5.0. ADDITIONAL DIFFERENT EMBODIMENTS
6.0. EXAMPLE PATTERN RECOGNITION PROCESS
7.0. EXAMPLES OF PATTERN APPLICATIONS
8.0. SCANNING METHODS
9.0. EXAMPLE FLOW CHARTS
10.0. IMPLEMENTATION MECHANISMS

1.0. General Overview

One aspect of the present approach is a method for enhancing user interaction within a virtual environment by linking physical objects to virtual manifestations. The method relates to a physical object having a surface with a pattern thereon. Furthermore, the method includes capturing, by a scanning device, an image of the pattern on the surface of the physical object; analyzing, by a computer system, the captured image to recognize the pattern and associate the pattern with corresponding virtual content stored in a data storage; and rendering, by the computer system, a virtual manifestation within the virtual environment. The virtual manifestation corresponds to the physical object based on the recognized pattern. It is displayed in a relative position to a user that mirrors the position of the physical object in the real world.

The method further comprises detecting, by the scanning device, the occlusion of the pattern caused by user interaction with the physical object; interpreting, by the computer system, the occlusion as a user input command for the virtual environment; modifying, by the computer system, the virtual manifestation in response to the user input command; and activating, by the computer system, one or more peripheral devices to generate non-visual physical stimuli corresponding to the virtual manifestation and the user interaction. The non-visual physical stimuli selected from the group consist of haptic feedback, heat, and scent to enhance the user's sensory experience.

The method further comprises updating, by the computer system, the virtual manifestation in real-time to reflect movements of the physical object captured by the scanning device, thereby maintaining the correspondence between the physical object and the virtual manifestation as the user interacts with the physical object.

According to another aspect, the physical object resembles a book with a surface resembling a cover and an interior surface or surfaces on which a pattern or patterns are printed.

According to yet another aspect, the pattern comprises a QR code that encodes location and physical attribute information, information related to the content of the virtual manifestation, and/or information related to a user.

According to another aspect, the scanning device is a camera integrated into a head-mounted display that displays the virtual environment.

According to yet another aspect, the computer system analyzes the captured image using a machine-learning algorithm trained to recognize and differentiate between a plurality of patterns.

According to another aspect, the virtual manifestation is a three-dimensional model that is rendered to appear as a continuation of the physical object within the virtual environment.

According to yet another aspect, detecting the occlusion of the pattern involves recognizing a hand gesture made by the user, the hand gesture corresponding to a command within the virtual environment.

According to another aspect, the computer system's peripheral devices include a haptic feedback device configured to simulate the texture and resistance of pages being turned in a book.

According to another aspect, the non-visual physical stimuli include a scent diffuser activated to release scents thematically related to the content being interacted with in the virtual environment.

In some embodiments, an apparatus for enhancing user interaction within a virtual environment by providing a physical connection to virtual manifestations comprises a physical object having a surface on which a pattern is disposed. The pattern is configured to be recognized by a computer system; a scanning device is configured to capture the pattern on the surface of the physical object and to generate input data based on the captured pattern; a computer system is communicatively coupled to the scanning device, wherein the computer system includes a processor and a memory storing instructions that, when executed by the processor, cause the computer system to analyze the input data to recognize the pattern; generate a virtual manifestation within a virtual environment corresponding to the recognized pattern, wherein the virtual manifestation is linked to the physical object and is rendered in a relative position to a user within the virtual environment that corresponds to the position of the physical object in the real world; detect occlusion of the pattern based on user interaction with the physical object and to control elements within the virtual environment based on the detected occlusion; a plurality of peripheral devices configured to provide non-visual physical stimuli to the user, wherein the peripheral devices are controlled by the computer system in response to the user's interaction with the virtual manifestation; wherein the apparatus is configured to operate within an extended reality, virtual reality, or mixed reality platform as an application or as an integrated part thereof, and wherein the virtual manifestation is not restricted to the physical characteristics of the physical object and is capable of displaying any two-dimensional or three-dimensional shape, object, or product of any size.

According to another aspect, the pattern disposed on the physical object's surface comprises geometric shapes, alphanumeric characters, images, or custom-designed symbols recognizable by the computer system.

According to another aspect, the scanning device is an optical camera capable of capturing the pattern in visible light, an infrared sensor for capturing in non-visible light, or a depth camera for capturing three-dimensional aspects of the pattern.

According to another aspect, the computer system is configured to analyze the input data using a machine-learning algorithm trained to recognize and differentiate between a plurality of patterns.

According to another aspect, the virtual manifestation is rendered as an augmented reality overlay that is visually superimposed on the user's perception of the real world.

In another aspect, the computer system is configured to detect the occlusion of the pattern by recognizing hand gestures made by the user and interpreting these gestures as commands within the virtual environment.

According to another aspect, the plurality of peripheral devices includes at least one haptic feedback device configured to simulate tactile sensations corresponding to interactions with the virtual manifestation.

According to another aspect, the apparatus is compatible with and configured to operate within an extended reality platform provided by a major technology company.

According to another aspect, the virtual manifestation can display any two-dimensional or three-dimensional shape, object, or product of any size. It is further configurable to adapt its display based on user preferences or environmental factors.

According to another aspect, the peripheral devices include a scent diffuser activated to release scents thematically related to the content being interacted with in the virtual environment.

According to another aspect, the system can display virtual gauges and controls that receive information from sensors, software, or machines seen in any number of industrial applications.

According to another aspect, the detection of the occlusion of the pattern in a location corresponding to virtual controls can generate commands to move the virtual controls.

According to another aspect, changes a user makes to the virtual controls can send information back to the sensors, software, or machines to alter or control the systems or machines.

1.1. Technical Problem-Technical Solution

Pattern recognition and management play a role in user interaction and virtual environments. In artificial, virtual, and mixed-reality environments, the ability to apply virtual volumes and information to real-world physical objects, objects, and surfaces is significant. A challenge persists in the lack of tangible interaction between virtual interfaces or display surfaces and the physical world. Users often interact with virtual spaces using input devices such as keyboards, computer mice, or hand controllers, which lack a direct physical correlation to their virtual counterparts. This disconnect can hinder the immersive experience and limit the potential for natural user interaction within virtual environments.

In mixed or augmented reality environments, where virtual components are overlaid on the real world, many solutions exist for defining where the virtual components should persist. Some solutions include creating a three-dimensional model of an area or environment that is stored and referenced. Virtual components are affixed to physical objects or surfaces about the virtual models that correspond to the real world. These methods rely on software and memory solutions to create a persistent presence of virtual manifestations in physical space. This computer-based reference system for virtual manifestations in the physical world lacks reliable physical persistence. Using a generated virtual reference of physical locations also requires storing and managing potentially complex location and object data that needs to be transferred to each user interacting with the environment. This carries the risk that the location and environment information can be erased, lost, or unavailable in low-power or low-connectivity situations.

Existing solutions in virtual environments primarily rely on visual and contextual cues to create a sense of immersion. While virtual objects and user interface components may appear anchored in a consistent physical location, there is no persistent physical presence or link to the location, and they cannot be touched or physically manipulated. This absence of a physical component that users can interact with in both the virtual and physical worlds results in a diminished connection to the virtual environment. The reliance on traditional computing or gaming input devices further exacerbates this issue, as these tools do not provide a one-to-one physical correspondence with virtual embodiments, thereby limiting the depth of user engagement and the overall immersive experience.

The present system addresses these challenges by establishing a robust link between the real and virtual worlds. This is achieved through patterns applied to physical objects, objects, or surfaces a computer system recognizes. The system includes software that analyzes inputs for these patterns and creates virtual manifestations within virtual environments that correspond to the physical entities. Additionally, the system employs apparatus or machines that generate non-visual physical stimuli, enhancing the connection with the physical world when interacting with virtual environments. The system facilitates a more immersive, persistent, and interactive experience by allowing users to interact with virtual embodiments by physically manipulating the corresponding real-world objects, augmented by non-visual cues that provide a tangible connection in the virtual world.

1.2. Technical Effects

By providing a physical object with a pattern and capturing an image of this pattern, the method enables the creation of a virtual manifestation directly linked to a physical object in the real world. This linkage allows for a more intuitive and immersive interaction within the virtual environment, as users can interact with virtual objects or surfaces that correspond to tangible items they can physically touch and manipulate.

An actual physical presence also allows the system to affect the physical world through virtual embodiments. Controls and switches can be rendered virtually in a location or context where they are needed in place of physical controls and switches. Virtual controls can be customized to a specific user, environment, or situation, mitigating the need for costly new physical hardware or equipment upgrades when equipment becomes obsolete.

Analyzing the captured image to recognize the pattern and associate it with virtual content ensures that the virtual manifestation is accurately positioned within the virtual environment to mirror the physical object's position in the real world. This mirroring enhances the user's spatial awareness and seamlessly integrates virtual and physical spaces.

Detecting pattern occlusion caused by user interaction and its interpretation as a user input command allows for a natural and direct method of controlling the virtual environment. This interaction paradigm leverages the user's familiarity with manipulating physical objects, thereby reducing the learning curve for interacting with and increasing the accessibility of virtual environments.

The modification of the virtual manifestation in response to user input commands provides a dynamic and responsive virtual experience, where changes in the virtual environment reflect the user's physical actions in real time, further enhancing the sense of presence within the virtual space.

Activating peripheral devices to generate non-visual physical stimuli, such as haptic feedback, heat, or scent, in correspondence with the virtual manifestation and user interaction enriches the multisensory experience of the user. This multisensory stimulation is designed to augment the realism of the virtual environment, making the virtual experiences more engaging and memorable by appealing to multiple senses beyond sight and sound.

1.3. Term Definitions

Many terms are used throughout the specification. Several such terms are defined below. For example, System 100 refers to the overall framework or architecture that enhances user interaction within a virtual environment by linking physical objects to virtual manifestations. It includes various components such as physical objects, scanning devices, computer systems, and peripheral devices.

101: Media—represents the source or input of patterns used in the system. It can include images, videos, or other visual content forms containing recognizable patterns.

102: Pattern B—refers to a specific pattern the system generates. This pattern is applied to physical objects or surfaces and is recognized by the computer system to create corresponding virtual manifestations within the virtual environment.

103: Pattern C—represents another specific pattern generated by a user. Similar to Pattern B, this pattern is applied to physical objects or surfaces and is recognized by the computer system to create virtual manifestations based on the user's input or customization.

104: Patterns—refers to any computer-discernable arrangement of data that can be applied to physical objects by various means or contained in data from a computer file or detected in input from any method of scanning device.

2.0. Example Block Diagram of a System with Various Pattern Inputs

FIG. 1A depicts a block diagram of the system with various pattern inputs. FIG. 1A shows System 100 in communication with Pattern A from Media 101 and Pattern C generated by a user 103. System 100 is configured to create Pattern B 102. The interaction between System 100 and Pattern A from Media 101 involves receiving data or inputs specific to Pattern A from Media 101. Similarly, System 100 receives inputs from Pattern C generated by a user 103, which may include user-specific data or user-generated content.

System 100 processes the received inputs from both Pattern A from Media 101 and Pattern C generated by a user 103 to generate Pattern B 102. The generation of Pattern B 102 by System 100 signifies the system's capability to synthesize or transform the received inputs into a new pattern or output. The relationship between the components indicates that System 100 is a central processing unit that integrates different patterns or data sources to produce a resultant pattern.

The significance of this configuration lies in the system's ability to interface with both media-derived patterns and user-generated patterns, suggesting a versatile application in fields where pattern recognition, synthesis, or customization is required. The depiction of the interactions in FIG. 1A provides a foundational understanding of the roles and capabilities of System 100 in relation to external patterns or inputs. For example, system 100 may apply patterns 104 stored in the system onto physical objects or surfaces 105 stored outside the system. The physical objects or surfaces, covered with patterns or not, may be scanned by, for example, a scanning device 106, and the scanned objects or images may be ported to system 100. According to another example, the physical objects or surfaces, covered with patterns or not, may be scanned by a scanning device 116 or by a phone camera 118, and a user may use the scanned objects or images to generate patterns, such as a pattern C 103.

System 100 is the central unit within the approach, orchestrating the interaction between various patterns and user inputs. Its pivotal role is to process and analyze patterns received, for example, from Media 101 and those generated by the system itself and the user. System 100 integrates these patterns to facilitate a specific operation or set of operations, which may include, but are not limited to, pattern recognition, pattern generation, and user interaction. System 100 may comprise a processor, memory, and communication interfaces to perform the designated functions.

3.0. Examples of Various Pattern Types Used for Recognition

Figure 1B:
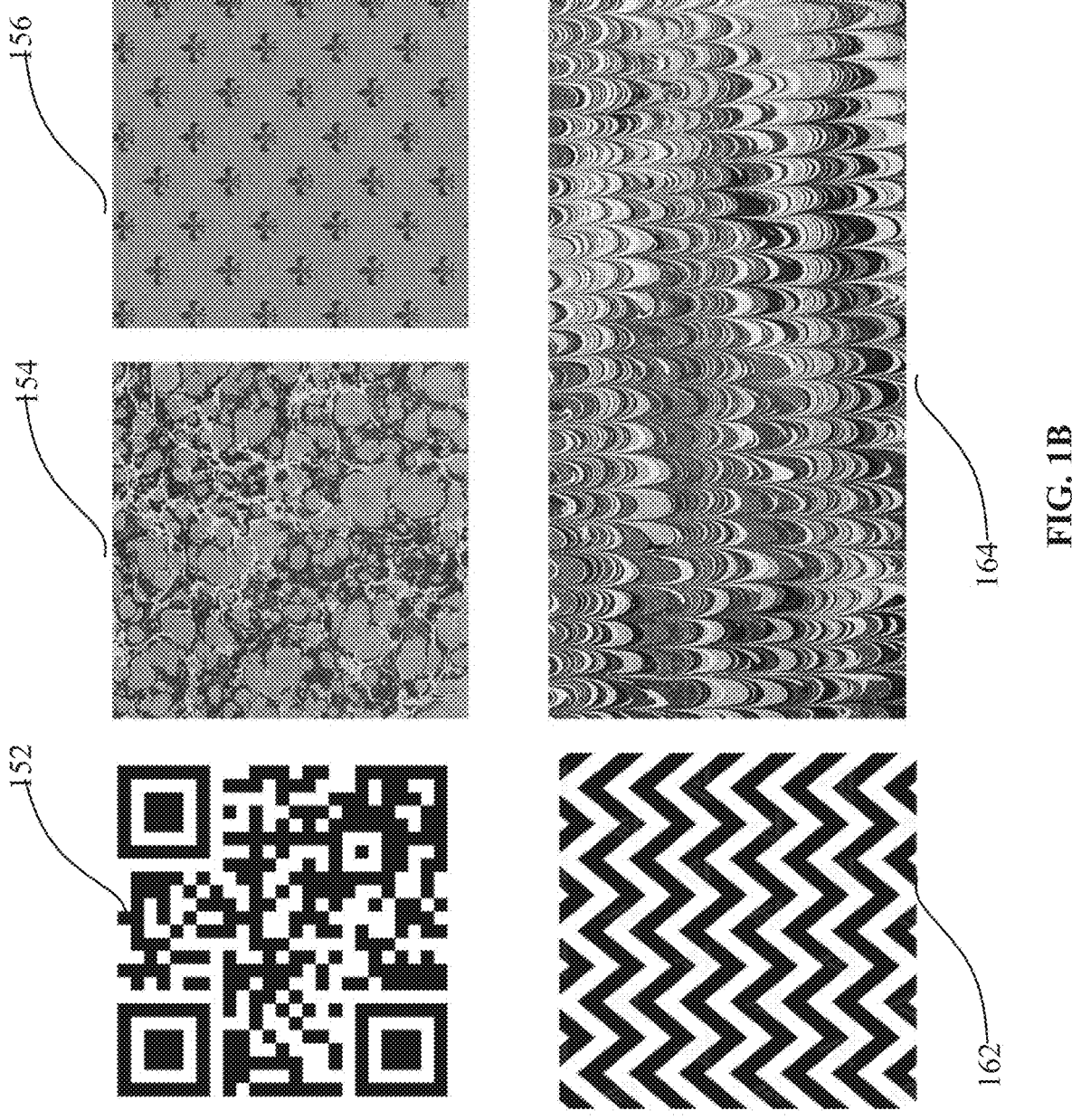
FIG. 1B displays examples of various pattern types used for system recognition.

FIG. 1B displays examples of various pattern types used for system recognition. FIG. 1B shows PATTERN A 152, PATTERN B 154, PATTERN C 156, PATTERN D 162 and PATTERN E 164. PATTERN A 152 comprises a two-dimensional Quick Response (QR) code, a matrix barcode that stores information for retrieval by a scanning device. PATTERN B 154, PATTERN C 156, PATTERN D 162, and PATTERN E 164 display complex image-based designs, which may serve as reference points for pattern recognition by a computer system.

PATTERN A 152, as a QR code, is designed to encode data that a scanning device can capture and a computer system can process to link physical objects to virtual manifestations within a virtual environment. The encoded data may relate to the virtual content corresponding to the physical object on which PATTERN A 152 is displayed.

PATTERNS 154/156/162/164, while differing in visual design, both function as recognizable patterns that a computer system can use to connect a physical object and the object's virtual counterpart. These patterns may be applied to surfaces of physical objects such as books, tabletops, or other tangible items to facilitate the rendering of virtual manifestations that correspond to these objects within a virtual environment.

The significance of PATTERN B 154 and PATTERN C 156 lies in their complexity and uniqueness, which allows for precise pattern recognition and differentiation by a computer system. This precision is essential for ensuring that the virtual manifestations rendered in the virtual environment accurately correspond to the correct physical object, enhancing the user's interaction and experience.

Overall, FIG. 1B illustrates patterns essential to the method and apparatus for enhancing user interaction within a virtual environment by providing a physical connection to virtual manifestations. These patterns enable the capture, recognition, and association of physical objects with virtual content, facilitating a more immersive and tactile experience in virtual, augmented, or mixed-reality environments.

Referring to both FIG. 1A-1B, Pattern A from Media 101 represents a predefined design or sequence that serves as a reference or starting point within the system 100. Media 101 may include a variety of forms, such as digital files, printed materials, or physical objects that embody Pattern A. The role of Pattern A from Media 101 is to provide a baseline for comparison or integration with other patterns within the system 100. Media 101 may be introduced to the system 100 through scanning devices, user input, or network communication protocols.

Pattern B generated by the system 102 is a derivative pattern created by system 100 based on Pattern A from Media 101 or other inputs. The generation of Pattern B by the system 102 involves computational processes that may include transformation, combination, or enhancement of the initial Pattern A. System 100 utilizes various algorithms and processing techniques to produce Pattern B, which may serve a specific purpose such as user authentication, object identification, or interactive feedback within the system's operational context.

Pattern C generated by a user 103 is a user-created pattern that interacts with system 100. User inputs, which result in the creation of Pattern C, may come from a variety of sources such as touch interfaces, voice commands, or motion detection systems. Pattern C generated by a user 103 allows for personalization and user-specific responses from system 100. The interaction between Pattern C and system 100 can lead to a multitude of outcomes, including the customization of system operations, the initiation of user-defined processes, or the modification of existing patterns within the system.

4.0. Different Embodiments

In some embodiments, a physical object could be an innovative coffee table with an integrated surface pattern that, when scanned by a specialized camera, triggers the appearance of a virtual coffee cup on a user's augmented reality (AR) headset. The virtual coffee cup would be rendered in the exact location of the pattern, allowing the user to reach out and "feel" the cup through haptic feedback devices embedded within the table's surface. This embodiment provides a seamless blend of physical and virtual interaction, enhancing the user's sensory experience within the virtual environment.

Another embodiment might involve a children's educational toy, such as a puzzle with pieces that have unique patterns. When a piece is placed correctly, a scanning device recognizes the pattern. It communicates with a computer system to display an animated character or story element on a nearby screen or within a mixed-reality headset. This embodiment entertains and educates by providing immediate virtual feedback on physical actions, reinforcing learning through interactive play.

A further embodiment could be a fitness apparatus, like a yoga mat with printed patterns corresponding to different poses. As the user performs yoga on the mat, a scanning device captures the pattern nearest to the user's current position and relays this information to a computer system. The system then projects a virtual instructor into the user's AR glasses to guide them through the correct pose, adjusting the virtual guidance in real time based on the user's alignment with the patterns on the mat. This embodiment offers a personalized and immersive fitness experience that combines the benefits of a physical workout with the guidance of a virtual instructor.

In another embodiment, the physical object could be a musician's instrument, such as a guitar with a patterned fretboard. As the musician plays, a scanning device detects the patterns where the fingers are placed, and the computer system generates a virtual visualization of the music being played, such as notes or tablature, in the musician's field of view through AR glasses. This embodiment provides an innovative way for musicians to learn and visualize music in real time, enhancing the process of mastering an instrument.

Each of these embodiments demonstrates the approach's versatility in providing a tangible connection between physical objects and their virtual counterparts, thereby enriching user interaction within virtual environments across various applications.

5.0. Additional Different Embodiments

In some embodiments, the system is constructed using various materials that offer different durability, weight, and cost-effectiveness levels. For instance, system components could be made from high-strength alloys for applications requiring robustness or lightweight composites where weight savings are critical. Another embodiment might feature modular design elements, allowing for easy replacement or upgrading of individual components without overhauling the entire system. This modularity could extend to including interchangeable parts catering to different performance specifications or environmental conditions.

As an example, panels with printed patterns can be used for command and control interfaces instead of costly control systems. In place of traditional analog or digital dials and switches in industrial settings, the patterned panels can be placed in stationary physical locations where virtual controls that can be interacted with can be presented. These controls can be adapted to individual users with specific duties, arranged or edited for a particular user's preference, or over time, can be changed in the virtual world to reflect the changed needs for controlling new or upgraded machines and systems in the physical world.

Furthermore, an embodiment could incorporate advanced control mechanisms, ranging from manual controls to fully automated, AI-driven systems that adjust the system's operation based on real-time data inputs. The system could also be scaled in size to suit various operational contexts, from compact versions for use in confined spaces to larger configurations for industrial-scale applications. Additionally, the system might offer multiple configurations of its components to optimize its functionality for specific tasks, such as altering the layout or orientation of certain parts to handle different types of workloads better or integrate seamlessly with existing equipment or processes.

In terms of operational methods, an embodiment could be designed to function under a range of power supply conditions, from no or low-power modes that conserve energy to high-performance modes that maximize output. The system could also be equipped with various sensors and feedback mechanisms to monitor its performance and provide diagnostics or predictive maintenance alerts, thereby enhancing reliability and longevity. While distinct in their specific features and applications, each of these embodiments would maintain the core functionality and adaptability outlined in the system's design.

6.0. Example Pattern Recognition Process

Figure 2:
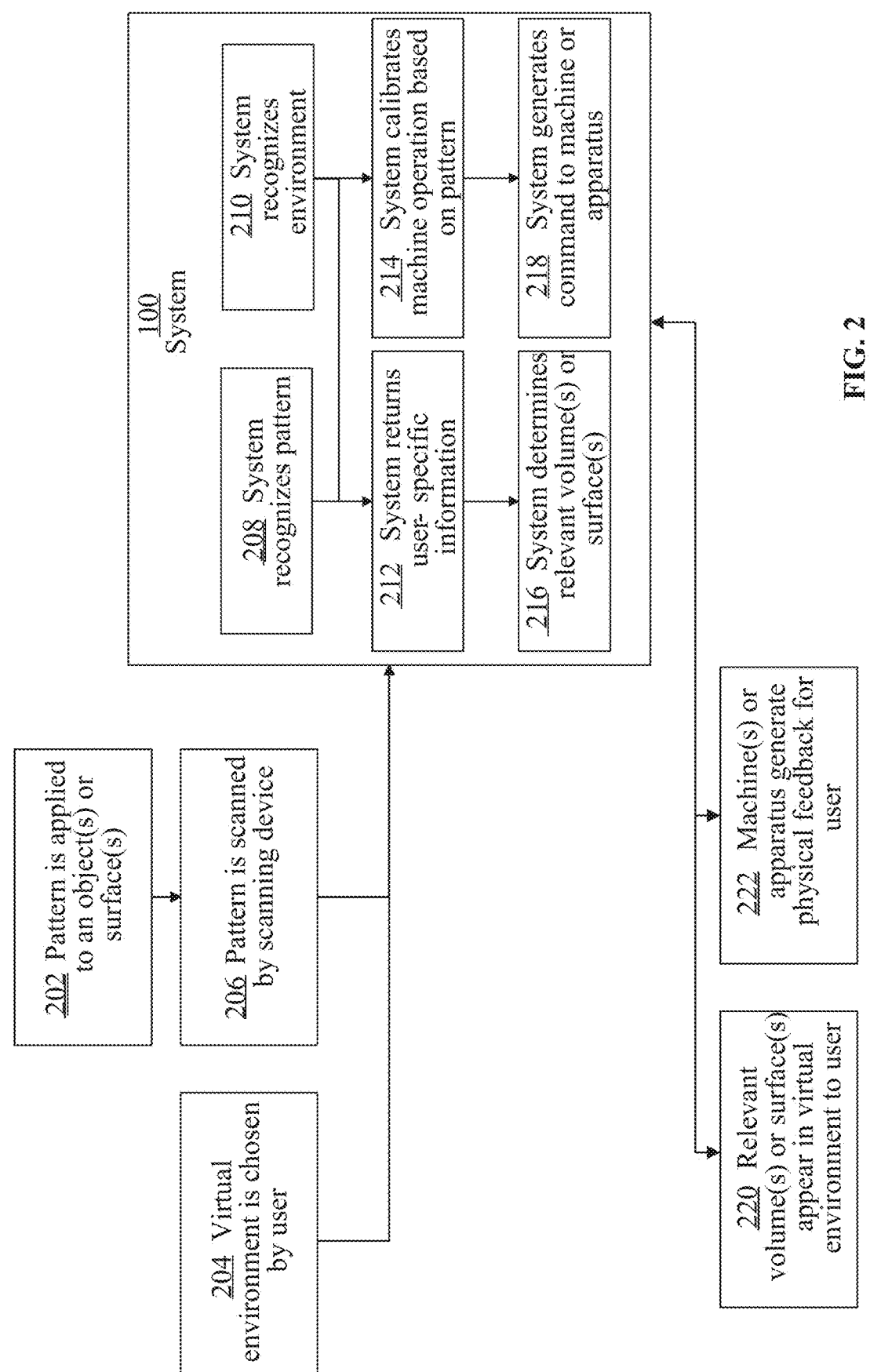
FIG. 2 is a block diagram illustrating the pattern recognition and interaction process within a mixed-reality environment.

FIG. 2 is a block diagram illustrating the pattern recognition and interaction process within a mixed-reality environment. FIG. 2 shows System 100, where a pattern is applied to an object or surface 202. A user selects a virtual environment 204, and a scanning device captures the pattern 206.

System 100 then recognizes the pattern 208 and identifies the virtual environment 210. Following this, System 100 returns user-specific information 212 and calibrates machine operation based on the recognized pattern 214. The system determines a relevant volume or surface 216 and generates a command to a machine or apparatus 218. Consequently, the appropriate volume or surface appears in the virtual environment to the user 220, and the machine or apparatus generates physical feedback for the user 222.

In the depicted example, the Pattern is applied to an object(s) or surface(s) 202 and is a foundational element in System 100. This component involves the application of a specific pattern, which may include a variety of shapes, symbols, or coded information, onto one or more physical objects or surfaces. Pattern 202 can be applied through various methods, such as printing, painting, or affixing a pre-designed label. The choice of pattern and application method depends on the intended use within the system and the nature of the object or surface. Once applied, Pattern 202 interacts with other components of System 100 to facilitate user interaction and system functionality.

"Pattern is scanned by scanning device 206" captures the visual or geometric information of Pattern 202. Scanning device 206 can be a camera, a 3D depth-sensing device, or any other suitable image capture technology capable of accurately detecting the applied pattern on the object or surface. The scanning process involves the conversion of the physical pattern into digital data that System 100 can process. Scanning device 206 ensures high fidelity in capturing the pattern to enable precise recognition and subsequent system actions.

"System recognizes pattern 208" is a component that involves analyzing and identifying the scanned pattern data by System 100. This component employs algorithms and processing techniques to compare the captured data against known patterns or a database of patterns to ascertain the identity of Pattern 202. Recognition of the pattern is necessary for System 100 to understand the user's interaction with the object or surface and to determine the system's appropriate response or action.

"System recognizes environment 210" involves identifying and understanding the virtual environment selected by user 204. This component is responsible for interpreting the context within which Pattern 202 is being used. Recognition of the environment is crucial for calibrating the system's response to the pattern and for providing a coherent and relevant user experience. System 100 utilizes data regarding the virtual environment to tailor its operations and outputs to match the user's expectations and the environmental context.

"System returns user-specific information 212" is a component that provides personalized data or feedback to the user based on the recognized pattern and environment. This component considers the user's preferences, history, and interactions with System 100 to generate information tailored to the individual. The user-specific information can include instructions, recommendations, or any other relevant data that enhances the user's engagement with the system and the virtual environment.

"System calibrates machine operation based on pattern 214" is a component that adjusts a machine's or apparatus's functioning in response to the recognized pattern. Calibration involves modifying operational parameters such as speed, force, heat, or movement patterns to align with the requirements dictated by Pattern 202. This component ensures that the machine or apparatus operates in a manner that is consistent with the user's interaction with the pattern and the chosen virtual environment.

"System determines relevant volume(s) or surface(s) 216" is a component that identifies the specific areas of interaction between the user, Pattern 202, and the virtual environment. This component assesses the spatial dimensions and locations pertinent to the user's activities and the system's response. Determining the relevant volumes or surfaces is essential for accurate system operation, as this component directs the focus of both virtual and physical responses to the areas of interest.

"System generates a command to machine or apparatus 218" is a component that translates the system's recognition and calibration processes into actionable instructions for a machine or apparatus. This component bridges the digital and physical aspects of System 100, converting data and decisions made within the virtual environment into real-world mechanical or electronic actions. The commands generated by this component direct the machine or apparatus to perform specific tasks that correspond to the user's interaction with the pattern and the virtual environment.

"Relevant volume(s) or surface(s) that appear in a virtual environment to user 220" is a component that visually represents the determined relevant volumes or surfaces within the virtual environment. This visual representation allows the user to perceive and understand the areas of interaction and focus within the virtual space. The appearance of these volumes or surfaces in the virtual environment aids the user in navigating and interacting with the system, clearly indicating where actions will occur or feedback will be received.

"Machine(s) or apparatus generate physical feedback for user 222" is a component that creates tangible responses or sensations for the user based on the system's operations. This feedback can take various forms, such as haptic vibrations, resistance, or motion, and is designed to enhance the user's sensory experience within the virtual environment. The physical feedback is synchronized with the virtual actions and user interactions, providing a cohesive and immersive experience that bridges the gap between the digital and physical realms.

A server (not shown) may be a component that provides centralized processing and data management capabilities for System 100. The server may host databases, manage user sessions, and perform complex computations the system requires. This component is often responsible for handling the heavy lifting of data processing, allowing for efficient system operation and timely responses to user interactions. The server communicates with other components of System 100 to coordinate system-wide activities and ensure seamless user experiences.

7.0. Examples of Pattern Applications

Referring again to FIG. 1A-1B, the system 100 integrates various components to facilitate the interaction between physical patterns and a virtual environment. System 100 includes Pattern A from Media 101, Pattern B generated by system 102, and Pattern C generated by a user 103. Pattern A from Media 101 is a predefined reference that System 100 utilizes to recognize and interpret physical patterns. Pattern B, generated by system 102, represents a machine-generated counterpart to Pattern A, which system 100 uses to compare and analyze patterns within the operational context. Pattern C generated by user 103 reflects user-created or user-modified patterns that system 100 processes to personalize the user's experience within the virtual environment.

Pattern A 101, Pattern B 102, and Pattern C 103 are essential to the system's ability to differentiate and process various patterns. Pattern A 101, originating from Media 101, provides a baseline for the system 100 to identify and calibrate responses. Pattern B 102, as generated by the system 102, allows for dynamic interaction and adaptation to the user's inputs or environmental changes. Pattern C 103, as generated by a user 103, introduces a level of customization and personalization, enabling the system 100 to cater to individual user preferences and requirements.

The system 100 applies Pattern A 101, Pattern B 102, and Pattern C 103 to an object(s) or surface(s) 202 within a chosen virtual environment 204. The scanning device 206 scans the applied patterns, and the system 100 recognizes the pattern 208 and the environment 210. Based on this recognition, the system 100 returns user-specific information 212 and calibrates machine operation based on the pattern 214. The system 100 determines relevant volume(s) or surface(s) 216 and generates commands to a machine or apparatus 218. The relevant volume(s) or surface(s) 220 appear in the virtual environment to the user, and the machine(s) or apparatus 222 generate physical feedback for the user.

FIG. 3A illustrates pattern applications on a physical object resembling a book cover. FIG. 3A illustrates the construction of a book form factor, displaying the physical characteristics of a book 302 with a cover and interior pages 304. This figure provides a visual representation of how the physical object, in this case, book 306, can be designed to resemble a traditional book with recognizable features such as a cover and pages. The pattern is printed on the interior surface of page 308, allowing for pattern recognition and interaction within the virtual environment. This embodiment demonstrates the application of the approach in the context of a book-like object, highlighting the potential for enhanced user interaction and immersion in virtual environments.

Figure 3B:
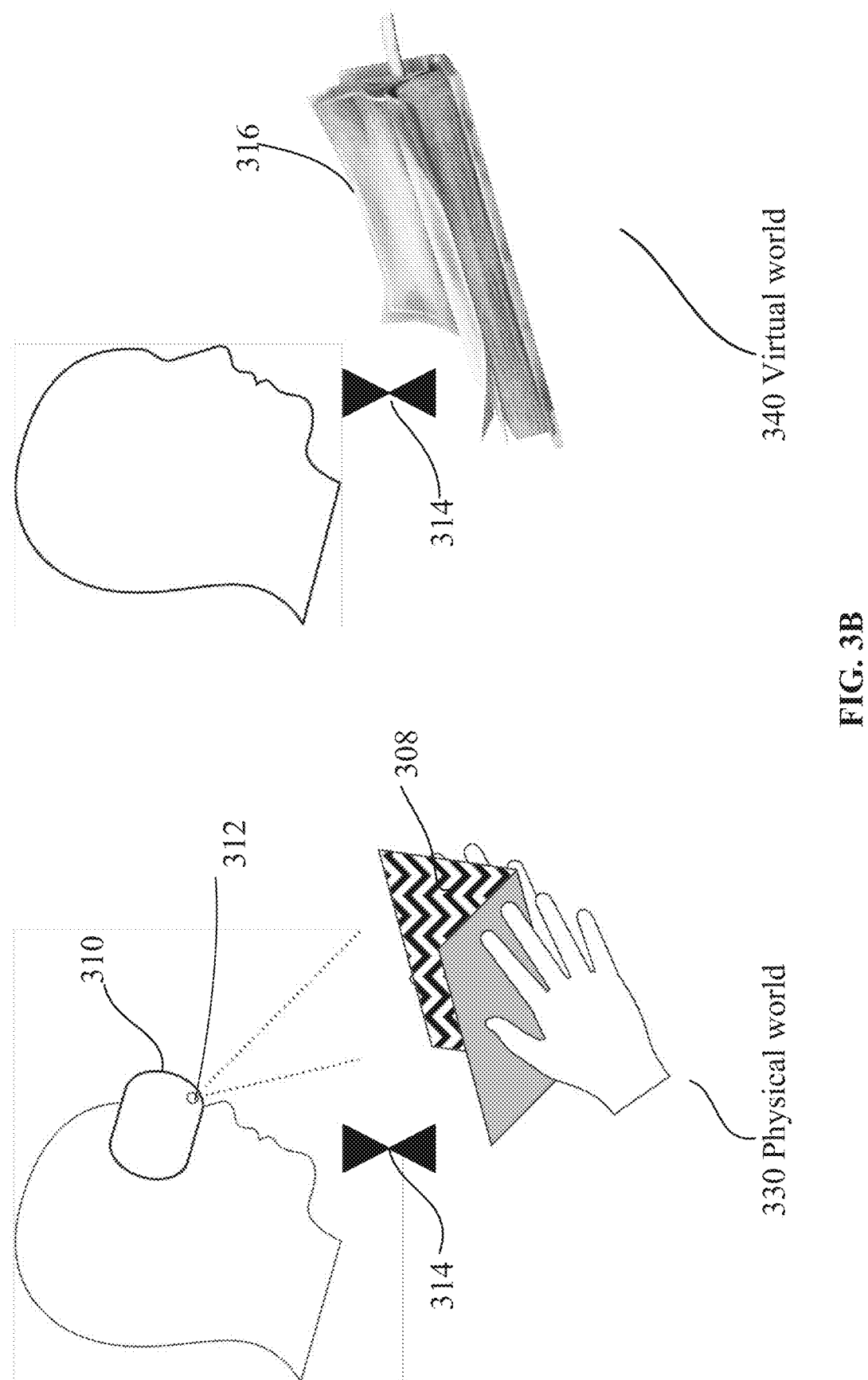
FIG. 3B illustrates the interaction between a user and a patterned object within a physical world and the corresponding virtual representation in a virtual world.

FIG. 3B illustrates the interaction between a user and a patterned object within a physical world and the corresponding virtual representation in a virtual world. FIG. 3B shows a side-by-side comparison of elements in both the physical and virtual worlds. On the left side, representing the physical world, a wearable headset 310 is depicted with a camera 312. Camera 312 is oriented toward a physical object 314, which displays patterns 308 on the surface of the physical object 314. A user's hand is shown interacting with the physical object 314, suggesting the capture of patterns 308 by camera 312.

On the right side, representing the virtual world, physical object 314 is shown again, but this time as a virtual representation of the physical object 316. The virtual representation 316 reflects the interaction occurring in the physical world, as indicated by the alignment of the physical object 314 in both the physical and virtual depictions. This alignment demonstrates the system's capability to mirror the position and orientation of the physical object 314 within the virtual environment, maintaining a consistent and corresponding virtual representation 316.

The figure illustrates the system's ability to bridge the gap between the physical and virtual worlds by capturing real-world interactions and translating them into the virtual environment. Camera 312 plays a role in this process by capturing patterns 308, which the system uses to recognize and render the virtual representation 316. The user's interaction with physical object 314, as captured by camera 312, is important to the system's functionality, enabling real-time updates to virtual representation 316 in response to the user's actions.

Wearable headset 310, equipped with camera 312, allows the user to interact with the virtual environment and physical object 314. Patterns 308, when recognized by system 100, facilitate the creation of a virtual representation of physical object 316, enhancing the user's immersive experience.

8.0. Scanning Methods

Figure 4:
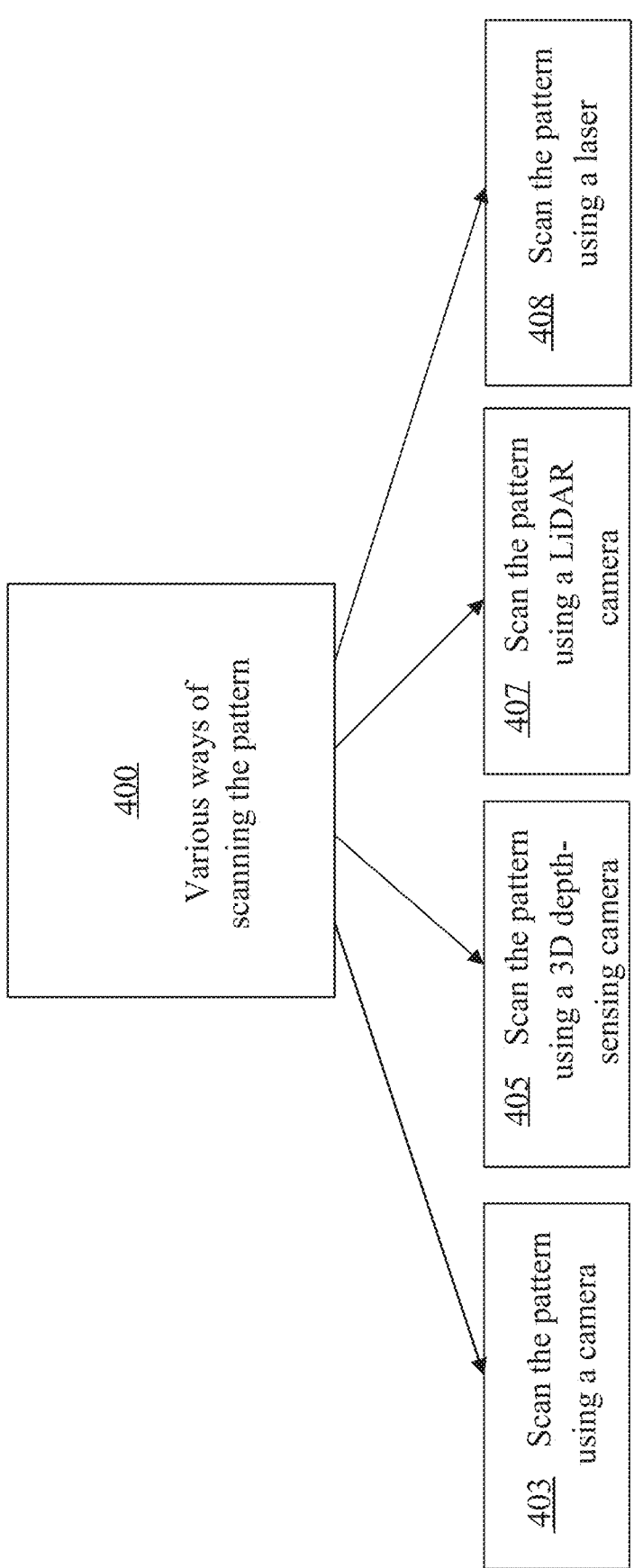
FIG. 4 illustrates a block diagram depicting various scanning methods for pattern recognition.

FIG. 4 illustrates a block diagram depicting various scanning methods for pattern recognition. FIG. 4 shows scanning the pattern 400 that encompasses multiple scanning technologies. The figure illustrates the use of various devices to capture the pattern on a surface of a physical object. Each device represents a different method of scanning, contributing to the system's ability to recognize patterns and associate them with corresponding virtual content. More than one scanning method can be used at a time to increase the ability of the system to capture and identify patterns.

"Scan the pattern using a camera 403" depicts a standard optical camera that captures images in visible light. This camera serves as a scanning device that can detect patterns on the surface of a physical object. The captured image data is then analyzed by a computer system to recognize the pattern.

"Scan the pattern using a 3D depth-sensing camera 405" represents a scanning device that captures not only the visual appearance of the pattern but also the pattern's three-dimensional characteristics. This depth information is important for recognizing patterns with physical depth or for applications where the spatial relationship of the pattern to the environment is significant.

"Scan the pattern using a LiDAR camera 407" shows a scanning device that utilizes Light Detection and Ranging technology. A LiDAR camera can accurately capture the contours and dimensions of the pattern by measuring the time the LiDAR camera takes for light to reflect back from the surface. This technology is particularly useful for capturing patterns in a variety of lighting conditions and at different ranges.

"Scan the pattern using a laser 408" indicates the use of a laser scanning device. This device can provide high-resolution capture of the pattern, which is beneficial for patterns that require precise measurement and recognition. Laser scanners are often used for their accuracy and the fine detail they can capture in pattern recognition tasks.

Overall, FIG. 4 demonstrates the system's versatility in using different scanning technologies to capture patterns on physical objects. Each scanning method contributes to the robustness of the system in recognizing and rendering virtual manifestations within a virtual environment.

"Scanning the pattern 400" involves various technologies to capture the physical patterns accurately. The camera 403, 3D depth-sensing camera 405, LiDAR camera 407, and laser 408 each offer different modalities for scanning the pattern, ensuring that the system 100 accurately captures the details necessary for processing and interaction within the virtual environment.

9.0. Example Flow Charts

FIG. 5A is a flow chart depicting an example process. More specifically, FIG. 5A depicts example steps of a method for enhancing user interaction within a virtual environment by linking physical objects to virtual manifestations. The example steps may be executed by a system, such as system 100 depicted in FIG. 1A.

In step 502, a system receives, from a scanning device, an image of a pattern on a surface of a physical object.

In step 504, the system analyzes the received image to recognize the pattern and associate the pattern with corresponding virtual content stored in a data storage.

In step 506, the system renders a virtual manifestation within the virtual environment. The virtual manifestation corresponds to the physical object based on the recognized pattern and is displayed in a relative position to a user that mirrors the position of the physical object in the real world.

In step 508, the system receives, from the scanning device, an indication of an occlusion of the pattern caused by user interaction with the physical object. If it is confirmed, in step 510, that the indication was received, the system proceeds to step 512. Otherwise, the system waits for the indication.

In step 512, the system interprets the occlusion based on a user input to the virtual environment.

The subsequent steps are described in FIG. 5B.

FIG. 5B is a flow chart depicting an example process. In step 522, the system modifies the virtual manifestation in response to the user input.

In step 524, the system activates one or more peripheral devices to generate non-visual physical stimuli corresponding to the virtual manifestation and the user interaction, wherein the non-visual physical stimuli are selected from a group consisting of haptic feedback, heat, and scent to enhance the user's sensory experience.

In step 526, the system updates the virtual manifestation in real-time to reflect movements of the physical objects based on further capturing by the scanning device, thereby maintaining the correspondence between the physical object and the virtual manifestation as the user interacts with the physical object.

10.0. Implementation Mechanisms

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
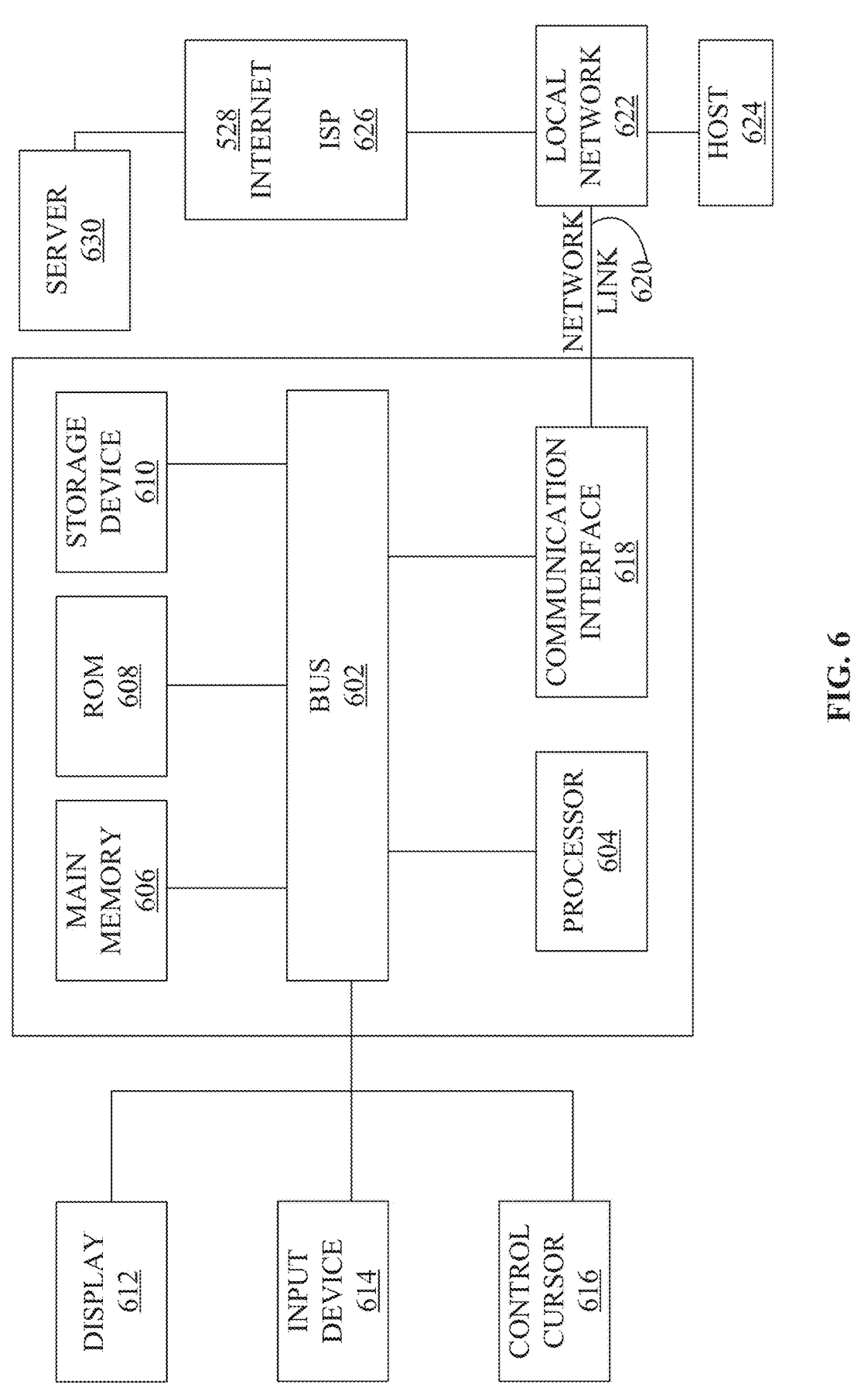
FIG. 6 is a block diagram that depicts an example computer system upon which embodiments may be implemented.

For example, FIG. 6 is a block diagram that illustrates a computer system 600. Computer system 600 includes a bus 602 or other communication mechanism for communicating information, and a hardware processor 604 coupled with bus 602 for processing information. Hardware processor 604 may be, for example, a microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio wave and infrared data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method for enhancing user interaction within a virtual environment by linking patterns on physical objects to virtual manifestations, the method comprising:

receiving, from a scanning device, an image of one or more a patterns on a surface of a physical object;

analyzing the image to recognize the pattern in the image;

wherein the pattern comprises a computer-discernible arrangement of data disposed on the surface of the physical object, the arrangement including a plurality of locations corresponding to virtual controls, and wherein the pattern encodes information related to content of the virtual manifestation;

based on the pattern, generating, within a virtual environment, allowing users to virtually interact with virtual objects, a virtual manifestation of the pattern; and associate the pattern with corresponding virtual content stored in a data storage;

rendering a virtual manifestation within a virtual environment;

wherein the virtual manifestation corresponds to the physical object based on the pattern and is displayed, on a display device, in a relative position to a user within the virtual environment;

receiving, from the scanning device, an indication of an occlusion of the pattern in one or more of the locations corresponding to virtual controls caused by user interaction with the physical object;

interpreting the occlusion based on a user input to the virtual environment as commands to modify the virtual environment;

wherein the occlusion of the pattern in one or more of the locations corresponding to the virtual controls is interpreted as different user input commands configured to modify the virtual manifestation;

based on the user input command, modifying the virtual manifestation to capture the user interaction with the pattern; and updating, on the display device, the virtual manifestation in real-time to reflect movements of the pattern based on further user inputs captured by the scanning device, thereby maintaining the correspondence between the physical pattern and the virtual manifestation as the user interacts with the physical object.

2. The method of claim 1, further comprising:

activating one or more peripheral devices to generate non-visual physical stimuli corresponding to the virtual manifestation and the user interaction;

wherein the non-visual physical stimuli are selected from a group consisting of haptic feedback, heat, and scent to enhance a user's sensory experience;

wherein the physical object is a book with a surface resembling a cover and an interior surface resembling pages on which the pattern is printed.

3. The method of claim 2, wherein the pattern comprises a QR code that encodes information related to the content of the virtual manifestation.

4. The method of claim 1, wherein the scanning device is a camera integrated into a head-mounted display used in the virtual environment.

5. The method of claim 1, further comprising analyzing the image using a machine-learning algorithm trained to recognize and differentiate between a plurality of patterns.

6. The method of claim 1, wherein the virtual manifestation is a three-dimensional model that is rendered to appear as a continuation of the physical object within the virtual environment.

7. The method of claim 1, wherein detecting the occlusion of the pattern involves recognizing a hand gesture made by the user, the hand gesture corresponding to a command within the virtual environment.

8. The method of claim 2, wherein the peripheral devices include a haptic feedback device configured to simulate texture and resistance of pages being turned in a book.

9. The method of claim 2, wherein the non-visual physical stimuli further include a scent diffuser activated to release scents thematically related to the content being interacted with in the virtual environment.

10. An apparatus for enhancing user interaction within a virtual environment by providing a physical connection to virtual manifestations, the apparatus comprising:

a computer system communicatively coupled to a scanning device, wherein the computer system includes a processor and a memory storing instructions that, when executed by the processor, cause the computer system to perform:

receiving, from a scanning device, an image of one or more patterns on a surface of a physical object;

analyzing the image to recognize the pattern in the image;

wherein the pattern comprises a computer-discernible arrangement of data disposed on the surface of the physical object, the arrangement including a plurality of locations corresponding to virtual controls, and wherein the pattern encodes information related to content of the virtual manifestation;

based on the pattern, generating, within a virtual environment, allowing users to virtually interact with virtual objects, a virtual manifestation of the pattern; and associate the pattern with corresponding virtual content stored in a data storage;

rendering a virtual manifestation within a virtual environment;

wherein the virtual manifestation corresponds to the physical object based on the pattern and is displayed, on a display device, in a relative position to a user within the virtual environment;

receiving, from the scanning device, an indication of an occlusion of the pattern in one or more of the locations corresponding to virtual controls caused by user interaction with the physical object;

interpreting the occlusion based on a user input to the virtual environment as commands to modify the virtual environment;

wherein the occlusion of the pattern in one or more of the locations corresponding to the virtual controls is interpreted as different user input commands configured to modify the virtual manifestation;

based on the user input command, modifying the virtual manifestation to capture the user interaction with the pattern; and updating, on the display device, the virtual manifestation in real-time to reflect movements of the pattern based on further user inputs captured by the scanning device, thereby maintaining the correspondence between the physical pattern and the virtual manifestation as the user interacts with the physical object.

11. The apparatus of claim 10, wherein the computer system further performs:

activating one or more peripheral devices to generate non-visual physical stimuli corresponding to the virtual manifestation and the user interaction;

wherein the non-visual physical stimuli are selected from a group consisting of haptic feedback, heat, and scent to enhance a user's sensory experience;

wherein the pattern disposed on the surface of the physical object comprises geometric shapes, alphanumeric characters, or custom-designed symbols recognizable by the computer system.

12. The apparatus of claim 10, wherein the scanning device is an optical camera capable of capturing the pattern in visible light, an infrared sensor for capturing in non-visible light, or a depth camera for capturing three-dimensional aspects of the pattern.

13. The apparatus of claim 10, wherein the computer system is configured to analyze input data using a machine-learning algorithm trained to recognize and differentiate between a plurality of patterns.

14. The apparatus of claim 10, wherein the virtual manifestation is rendered as an augmented reality overlay that is visually superimposed on a user's perception of the real world.

15. The apparatus of claim 10, wherein the computer system is configured to detect occlusion of the pattern by recognizing hand gestures made by the user and interpreting these gestures as commands within the virtual environment.

16. The apparatus of claim 11, wherein the one or more peripheral devices includes at least one haptic feedback device configured to simulate tactile sensations corresponding to interactions with the virtual manifestation.

17. The apparatus of claim 10, wherein the apparatus is compatible with and configured to operate within an extended reality platform.

18. The apparatus of claim 10, wherein the virtual manifestation is capable of displaying any two-dimensional or three-dimensional shape, object, or product of any size, and is further configurable to adapt its display based on user preferences or environmental factors.

19. The apparatus of claim 11, wherein the one or more peripheral devices further include a scent diffuser activated to release scents thematically related to the content being interacted with in the virtual environment.

20. One or more non-transitory computer-readable storage media storing one or more computer instructions which, when executed by one or more computer processors, cause the computer processors to perform:

receiving, from a scanning device, an image of one or more patterns on a surface of a physical object;

analyzing the image to recognize the pattern in the image;

wherein the pattern comprises a computer-discernible arrangement of data disposed on the surface of the physical object, the arrangement including a plurality of locations corresponding to virtual controls, and wherein the pattern encodes information related to content of the virtual manifestation;

based on the pattern, generating, within a virtual environment, allowing users to virtually interact with virtual objects, a virtual manifestation of the pattern; and associate the pattern with corresponding virtual content stored in a data storage;

rendering a virtual manifestation within a virtual environment;

wherein the virtual manifestation corresponds to the physical object based on the pattern and is displayed, on a display device, in a relative position to a user within the virtual environment;

receiving, from the scanning device, an indication of an occlusion of the pattern in one or more of the locations corresponding to virtual controls caused by user interaction with the physical object;

interpreting the occlusion based on a user input to the virtual environment as commands to modify the virtual environment;

wherein the occlusion of the pattern in one or more of the locations corresponding to the virtual controls is interpreted as different user input commands configured to modify the virtual manifestation;

based on the user input command, modifying the virtual manifestation to capture the user interaction with the pattern; and updating, on the display device, the virtual manifestation in real-time to reflect movements of the pattern based on further user inputs captured by the scanning device, thereby maintaining the correspondence between the physical pattern and the virtual manifestation as the user interacts with the physical object.

* * * * *